United States Patent [19]
Given

[11] Patent Number: 5,481,597
[45] Date of Patent: Jan. 2, 1996

[54] SENT MESSAGE CANCELLATION ARRANGEMENT

[75] Inventor: Paul Given, Westminster, Colo.

[73] Assignee: AT&T Corp., Murray Hill, N.J.

[21] Appl. No.: 310,558

[22] Filed: Sep. 21, 1994

Related U.S. Application Data

[63] Continuation of Ser. No. 28,443, Mar. 9, 1993, abandoned.

[51] Int. Cl.$^6$ .................................................. H04M 1/64
[52] U.S. Cl. ........................ 379/67; 379/74; 379/88; 379/89
[58] Field of Search ............................ 379/67, 74, 77, 379/88, 89, 100

[56] References Cited

U.S. PATENT DOCUMENTS

| | | | |
|---|---|---|---|
| 4,327,251 | 4/1982 | Fomenko et al. | 179/1 SM |
| 4,588,857 | 5/1986 | Arsem | 379/77 |
| 4,783,800 | 11/1988 | Levine | 379/88 |
| 4,850,005 | 7/1989 | Hashimoto | 379/88 |
| 4,853,952 | 8/1989 | Jachmann et al. | 379/88 |
| 4,972,461 | 11/1990 | Brown et al. | 379/89 |
| 5,003,575 | 3/1991 | Chamberlin et al. | 379/74 |
| 5,133,004 | 7/1992 | Heileman, Jr. et al. | 379/67 |
| 5,153,905 | 10/1992 | Bergeson et al. | 379/88 |
| 5,196,943 | 3/1993 | Hersee et al. | 379/88 |
| 5,204,894 | 4/1993 | Darden | 379/88 |
| 5,353,259 | 10/1994 | Howes et al. | 379/89 |
| 5,355,406 | 10/1994 | Chencinski et al. | 379/88 |

FOREIGN PATENT DOCUMENTS

| | | | |
|---|---|---|---|
| 0175827 | 7/1991 | Japan | 379/88 |
| 9101604 | 2/1991 | WIPO | 379/88 |

OTHER PUBLICATIONS

"Repartee® Training Guide, Version 6.0", Active Voice Corp., 1988–1990, pp. 1–10.
"AT&T Quick Guide to Audix" Issue 2 pp. 1–13, Feb. 1988.
"AT&T System 85/Audix", AT&T Information Systems, Jan. 1989 pp. 1–5.
"Distribution Duplication Prevention Mechanism", 33642, Apr. 1992.

Primary Examiner—Jeffery Hofsass
Assistant Examiner—Scott L. Weaver
Attorney, Agent, or Firm—David Volejnicek

[57] ABSTRACT

A messaging arrangement (10) allows an originator of a message to cancel a sent message that has not been retrieved by the recipient, if permission for such cancellation has been given by the recipient. The message originator tags (258, 378) the message with a code (51) when he or she creates the message. Subsequently, the originator may access (301) the message recipient's mailbox (23) and cancel (330) the message by giving the message's tag code.

22 Claims, 6 Drawing Sheets

SENT MESSAGE CANCELLATION ARRANGEMENT

This application is a continuation of application Ser. No. 08/028,443, filed on Mar. 9,1993, now abandoned.

TECHNICAL FIELD

This invention relates to electronic messaging systems.

BACKGROUND OF THE INVENTION

In electronic messaging systems, it sometimes happens that an originator of a message wishes to cancel the message, for example, because the originator has decided that the message was sent to the wrong person, or that changed circumstances have rendered the message inaccurate or unneeded.

Known electronic messaging systems do not offer the message originator the capability of canceling the sent message. Some systems which allow the originator to formulate the message in the sender's own mailbox prior to sending the message to the recipient'mailbox, such as the AT&T Audix® Voice Messaging System, allow the message originator to reaccess and cancel the message prior to the message being sent out, i.e., while it is still in the originator's own mailbox. But once the message has been sent or delivered to the recipient's mailbox, the originator loses the ability to cancel or otherwise access the message.

SUMMARY OF THE INVENTION

This invention is directed to solving these and other disadvantages of the prior art. Generally, according to the invention, an originator of a message is enabled to cancel a sent message—e.g., one that has been delivered to the recipient's mailbox—that has not been retrieved by the recipient. The message originator tags the message with a tag, such as a numerical code that serves as an identifier of the message, when he or she creates the message. Subsequently, the originator may access the message recipient's mailbox and cancel the message by giving the message's tag.

Specifically according to the invention, a messaging apparatus, and a method of operating it, store a message that is tagged with a message identifier in a mailbox of a recipient of the tagged message. Preferably, it is a request from the message originator that leads to the message being tagged with the message identifier. Also, preferably, the message identifier is obtained from the message originator, although in some circumstances, it may be advantageous to have the identifier be automatically generated. When subsequently the message originator, or even any caller who has reached the recipient's mailbox, supplies the message identifier of that stored message, the originator or caller is provided access to that stored message in the recipient's mailbox. Illustratively, the access may comprise canceling that stored message, or merely modifying, e.g., revising, that stored message. The message originator thus gains the ability to exercise control over a message—to access it and modify or cancel it—even after the originator has otherwise relinquished control of the message by sending it to the recipient's mailbox and/or storing it in the recipient's mailbox.

These and other advantages and features of the invention will become more apparent from the following description of an illustrative embodiment of the invention considered together with the drawing.

DETAILED DESCRIPTION

Figure 1:
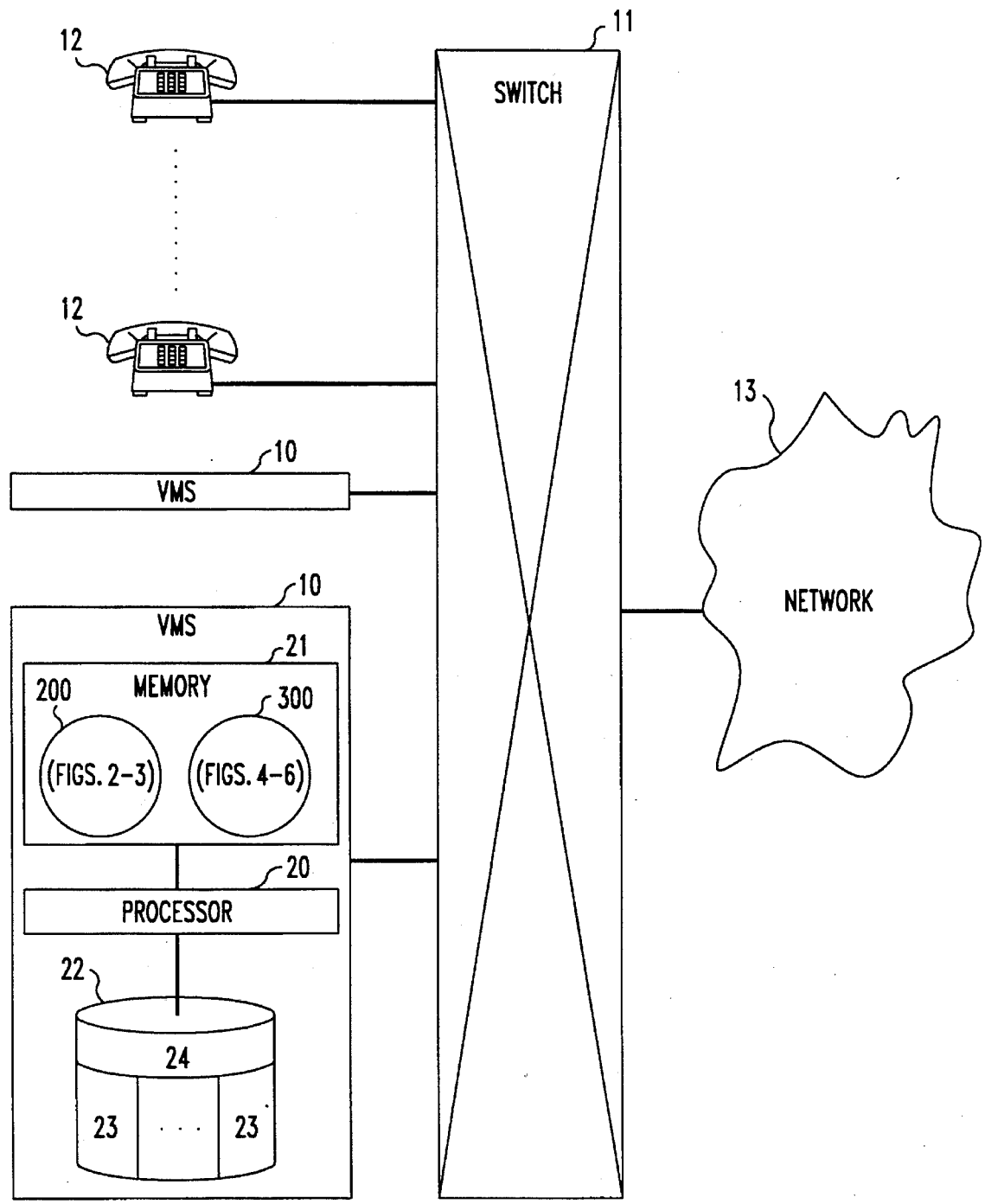
FIG. 1 is a block diagram of a messaging system embodying an illustrative example of the invention.
Figure 2:
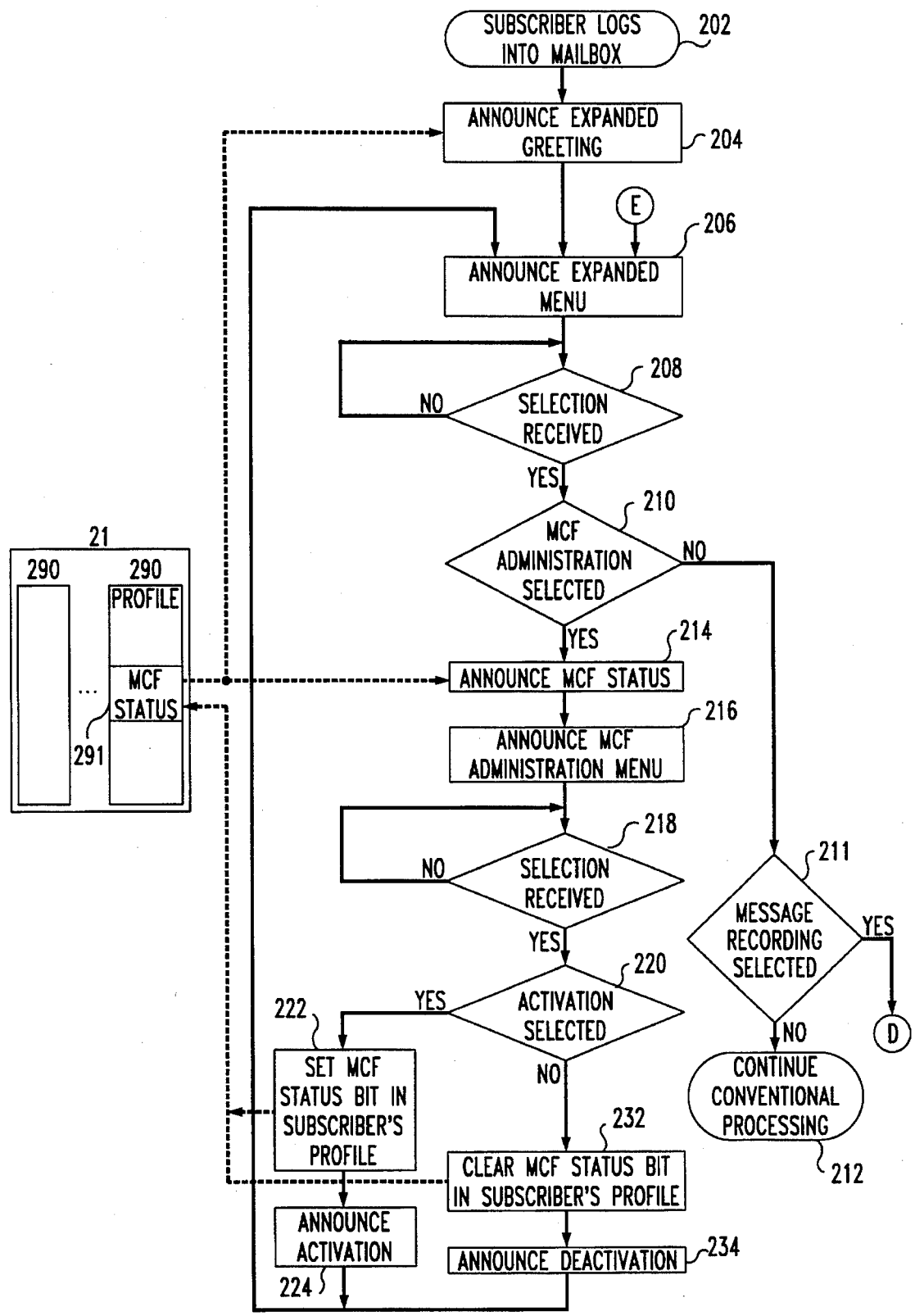
FIGS. 2–3 are flow diagrams of functions performed in response to a subscriber accessing their own mailbox in a voice message system of the system of FIG. 1.
Figure 3:
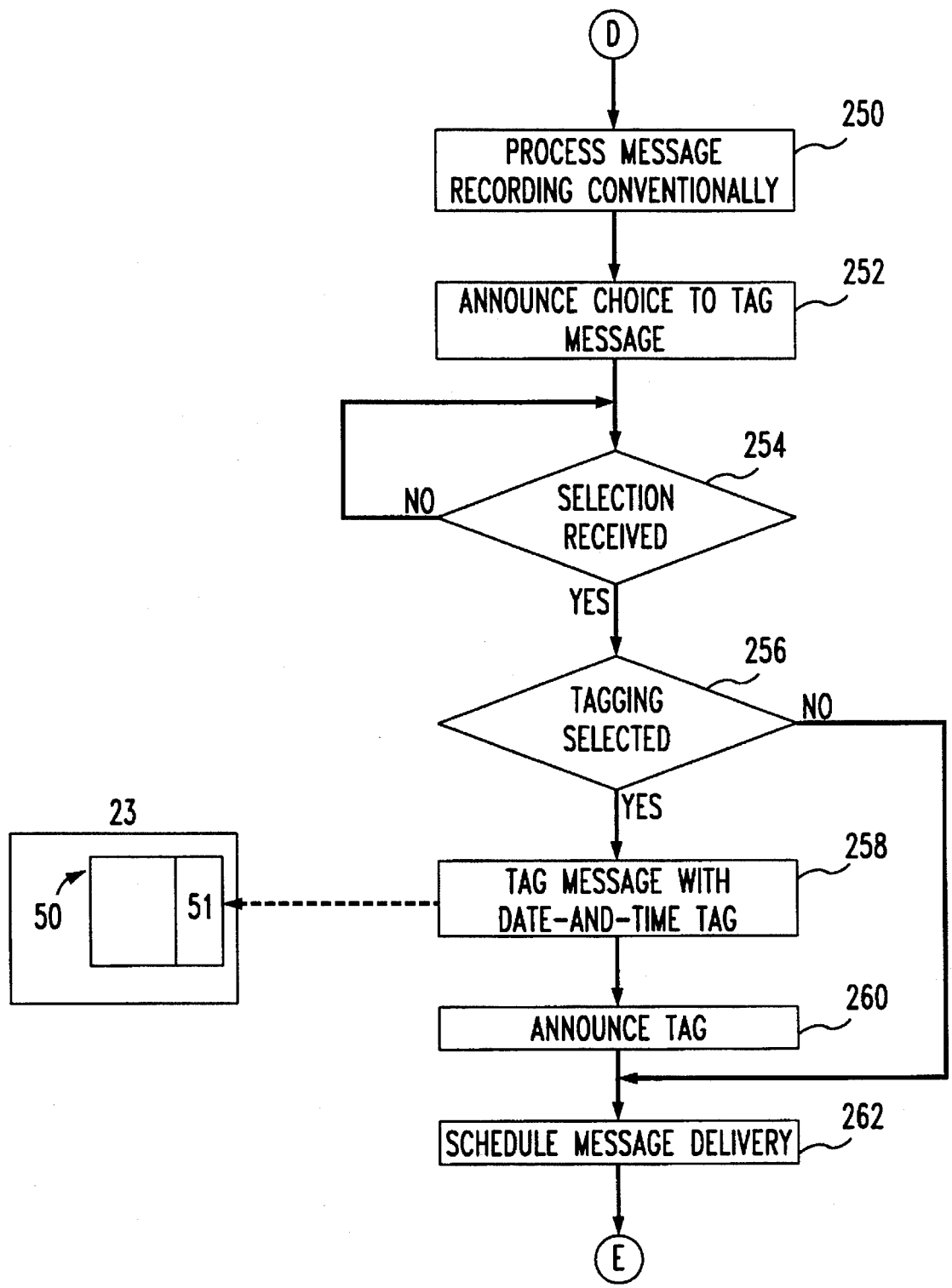

FIG. 1 shows, in block diagram form, an illustrative messaging system. The system is illustratively a voice messaging system, comprising one or more AT&T Audix Voice Message Systems (VMSs) 10. VMSs 10 are interconnected with each other, and with service subscribers' and callers' telecommunications terminals 12, by a switching system 11, such as a local telephone central office or a private branch exchange (PBX). Switching system 11 may be a part of a telecommunications network 13 that may include other VMSs 10 and callers' terminals 12. Without loss of generality, the following discussion will not concern itself with telecommunications network 13, with the understanding that the principles of the invention described below are equally applicable thereto.

Each VMS 10 is a processor-controlled unit operating under stored-program control. Each VMS 10 includes a processor 20 which executes programs out of memory 21, and also controls a disk memory 22 that implements mailboxes 23 of subscribers served by that VMS 10. Disk memory 22 also stores announcements 24 that can selectively be retrieved and played out to subscribers and callers, in a conventional manner. According to the invention, each VMS 10 includes programs 200 and 300 in its memory 21, whose execution implements the functionality necessary to enable message originators to cancel sent messages. This functionality is flowcharted in FIGS. 2–6.

A service subscriber has the option of selectively enabling or disabling the message cancellation functionality (MCF) for messages for which they are the recipient. To make the selection, the subscriber logs into his or her message mailbox 23 on VMS 10 in the conventional manner, through terminal 12 and switch 11. Successful logging in of the subscriber causes processor 20 of VMS 10 to perform the functions flowcharted in FIGS. 2–3.

In response to the successful login, at step 202, processor 20 announces an expanded greeting to the logged-in subscriber, at step 204. The expanded greeting is illustratively the conventional system greeting supplemented with an indication of whether or not the subscriber's MCF is activated or deactivated. Processor 20 illustratively obtains this information by checking an MCF status bit 291 in the subscriber's otherwise-conventional profile 290 stored in memory 21. Processor 20 then announces an expanded menu of choices for further action to the subscriber, at step 206. The expanded menu is illustratively the conventional menu supplemented with a choice to administer the subscriber's own MCF. Processor 20 then awaits the subscriber's selection, at step 208. If the subscriber elects not to administer his or her MCF, as determined at step 210, processing continues at step 211.

If, however, the subscriber elects to administer the MCF, processor 20 proceeds to step 214 to announce the present status of the subscriber's MCF. This announcement is illustratively identical to the supplement to the conventional greeting, described in conjunction with step 204. Processor 20 then announces the MCF administration menu to the subscriber, at step 216. Illustratively, the menu announcement informs the caller as to which pushbutton to press on his or her terminal 12 to activate MCF, and which pushbutton to press to deactivate MCF. Processor 20 then awaits the subscriber's selection, at step 218. If the subscriber elects MCF activation, as determined at step 220, processor 20 sets MCF status bit 291 in the subscriber's profile 290 in memory 21, at step 222, and announces the activation to the subscriber, at step 224. If the subscriber elects MCF deactivation, at step 220, processor 20 clears MCF status bit 291 in the subscriber's profile 290, at step 232, and announces the deactivation to the subscriber, at step 234. Following step 224 or 234, processor 20 returns to step 206 to determine what the subscriber wishes to do next.

Subscribers have the option of sending out messages through their own mailboxes 23. One of the options that is presented to the subscriber at step 206 is to record a message. If it is determined at step 211 that the subscriber elected to record a message, processor 20 interacts with the subscriber in a conventional manner to record the message, at step 250 of FIG. 3. The interaction at step 250 includes determining the message's intended recipients from the subscriber's input.

After all conventional message recording functions have been completed at step 250, processor 20 announces to the subscriber a choice to tag the message for subsequent cancellation, at step 252. Illustratively, the announcement is "If you tag this message, you may have the option to cancel it later, if the recipient so permits. If you wish to tag the message, press one; if you do not wish to tag the message, press two." Processor 20 then awaits the subscriber's selection, at step 254. If tagging is not selected, as determined at step 256, processor 20 merely schedules the message for delivery to its intended recipients, at step 262, in a conventional manner, and then returns to step 206 of FIG. 2 to determine what the subscriber wishes to do next. The delivery involves sending the message to mailboxes 23 of the intended recipients at a desired time. The recipients may be served either by the same VMS 10 as the message originator, or by another VMS 10 as described in U.S. Pat. No. 4,790,003.

Returning to step 256, if it is determined that the subscriber has elected to tag the message, processor 20 tags the message with a tag that is an automatically-generated code representing the present date and time, at step 258. Processor 20 accomplishes the tagging by including the tag in tag field 51 of a header 50 for the message that was created at step 250. Processor 20 also announces the tag to the subscriber, at step 260. Processor 20 then proceeds to step 262 to schedule the message for delivery. Message delivery is accomplished in a conventional manner. The recipient's mailbox 23 is accessed and the tagged message is stored therein.

A caller who is trying to reach the subscriber gets connected to VMS 10 by switching system 11 in the conventional manner. The connection causes processor 20 of VMS 10 to perform the functions flowcharted in FIGS. 4–6.

As part of the conventional establishment of the connection of the caller to the subscriber's mailbox 23 in VMS 10, at step 301, processor 20 determines the identity of the called subscriber. The subscriber's identity determines which mailbox 23 is accessed by the caller. Processor 20 now uses the information to determine whether the subscriber's MCF is activated or deactivated, at step 302. Illustratively, processor 20 again makes the determination by examining the state of MCF status bit 291 in the identified subscriber's profile 290 in memory 21. If the subscriber's MCF is deactivated, as determined at step 304, processor 20 processes the call in a conventional manner, at step 314. If, however, the subscriber's MCF is activated, processor 20 announces the conventional greeting to the caller, at step 306. This greeting informs the caller of the identity of the subscriber whose mailbox 23 the caller has reached. Processor 20 follows up the greeting with an expanded menu, at step 308. The expanded menu is illustratively the conventional menu inviting the caller to record a message for the subscriber, supplemented with an additional menu choice such as "Press one to gain access to additional features." Processor 20 then awaits the caller's selection, at step 310. If the caller's choice is other than to access additional features, as determined at step 312, processor 20 proceeds to step 314 to continue processing the call in a conventional manner. For example, if the caller elects to record a message, processor 20 prompts for and records the message, creates a header 50 for the recorded message, stores header 50 in the subscriber's mailbox 23, determines if the message-waiting (MW) light of the subscriber's terminal 12 is turned on, and turns it on if it is not on. If the caller has not hung up, processor 20 then returns to step 308 to determine what the caller wishes to do next.

If it is determined at step 312 that the caller elected to access additional features, processor 20 announces a menu of the additional features to the caller, at step 316. This is a menu of the MCF features. Illustratively, the announcement is "If you tag this message with a five-digit tag code, you will have the option to cancel it later. If you wish to cancel this message or one that you left earlier, press one. If you wish to tag this message so you can cancel it at a later time, press two." Processor 20 then awaits the caller's selection, at step 318. If the caller elects to tag the just-recorded message, as determined at step 320, processor 20 prompts the caller to enter the tag, at step 370 of FIG. 5. Illustratively, the prompt is "Please enter your five-digit tag code." Processor 20 then awaits the caller's input, at step 372. In this example, the tag entered by the caller may be any five digits selected by the caller; alternative embodiments may allow any other type and length of tag. Upon receipt of the tag from the caller, processor 20 checks fields 51 of headers 50 of messages in the subscriber's mailbox to determine if the just-received tag has already been used to tag another of the recipient's messages, or is unique, at step 374. If the tag is not unique, processor 20 announces this fact to the caller and requests the caller to select another tag, at step 376. Processor 20 then returns to step 370 to prompt the caller for the new tag.

If it is determined at step 374 that the received tag is unique, processor 20 tags the message with the tag, at step 378, by including the tag in tag field 51 of the message's header 50 in the subscriber's mailbox 23. Processor 20 then announces the successful tagging to the caller, along with a menu of choices for further action, at step 380. This announcement is illustratively as follows: "The message has been tagged with tag code __. You may call back and cancel the message at any time prior to it being retrieved by the recipient. To cancel another message, press two; to return to the main menu, press three; otherwise hang up." Processor 20 then awaits the caller's selection, at step 382. If the caller elects to cancel another message, as determined at step 384, processor 20 proceeds to step 322. If the caller elects to return to the main menu, as determined at step 386, processor 20 returns to step 308. If the caller hangs up, processing of the call is completed, and processor 20 exits the call processing functions, at step 388.

Figure 4:
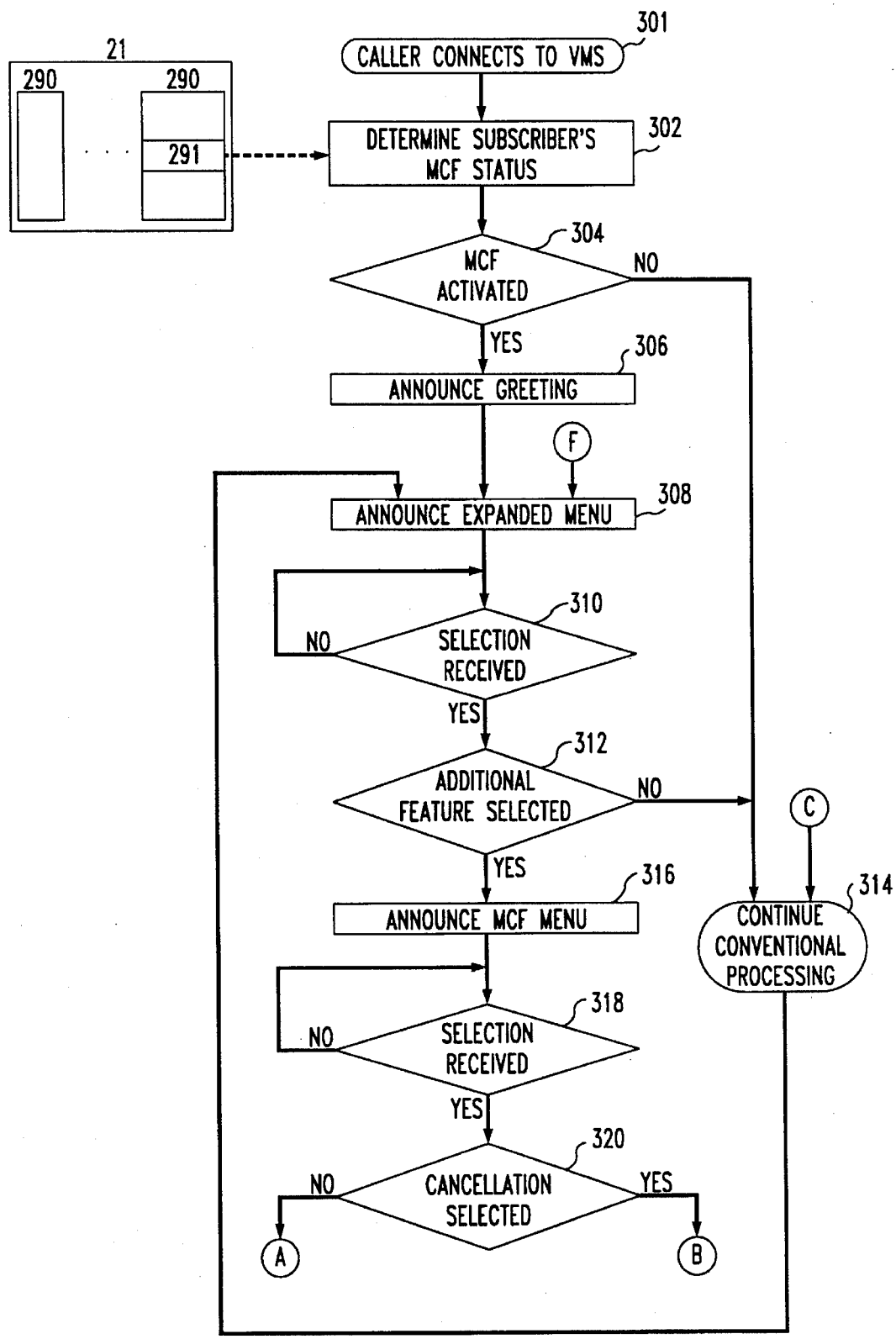
FIGS. 4–6 are flow diagrams of functions performed in response to a caller accessing a subscriber's mailbox in the voice message system of the system of FIG. 1.
Figure 5:
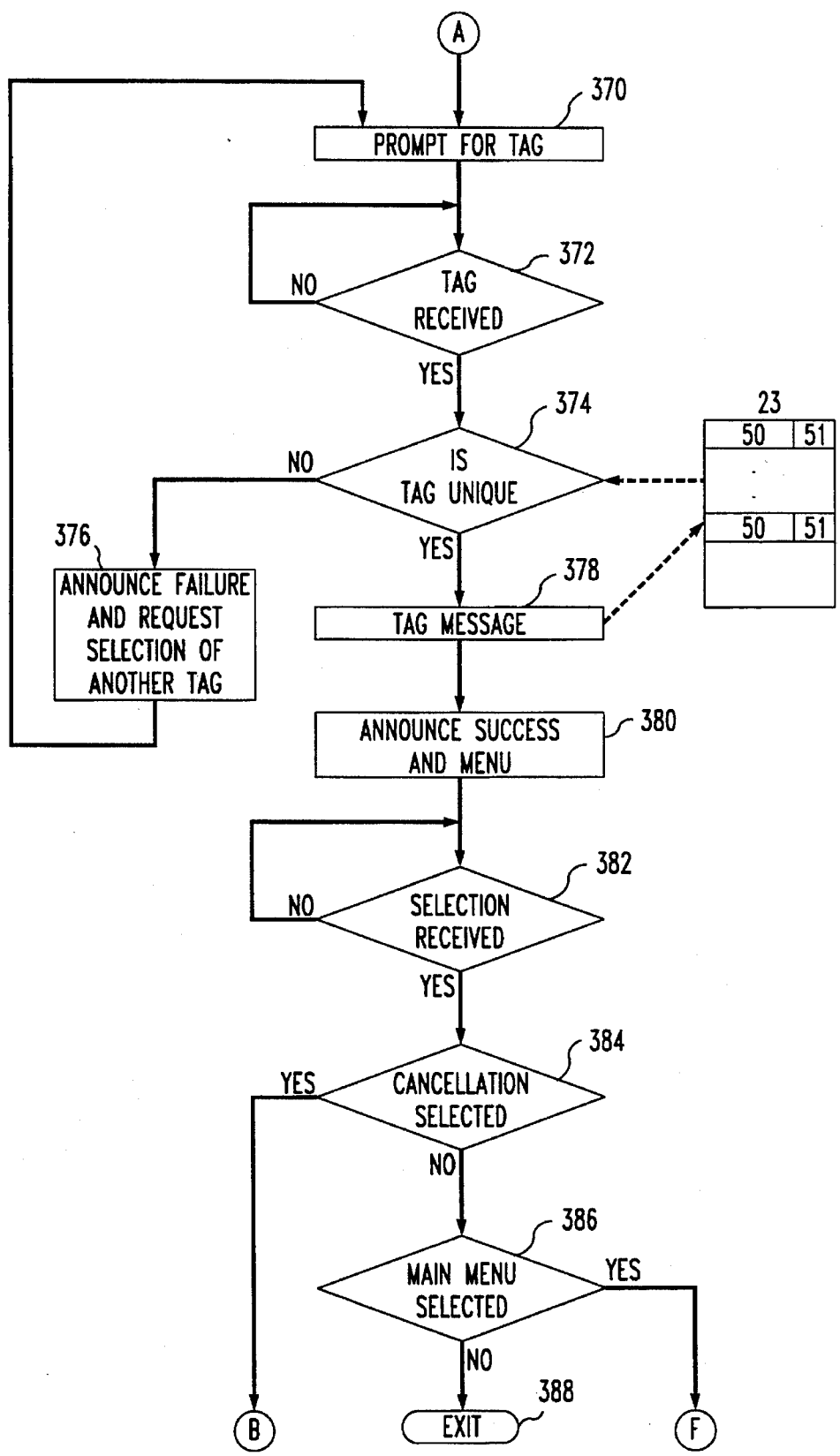
Figure 6:
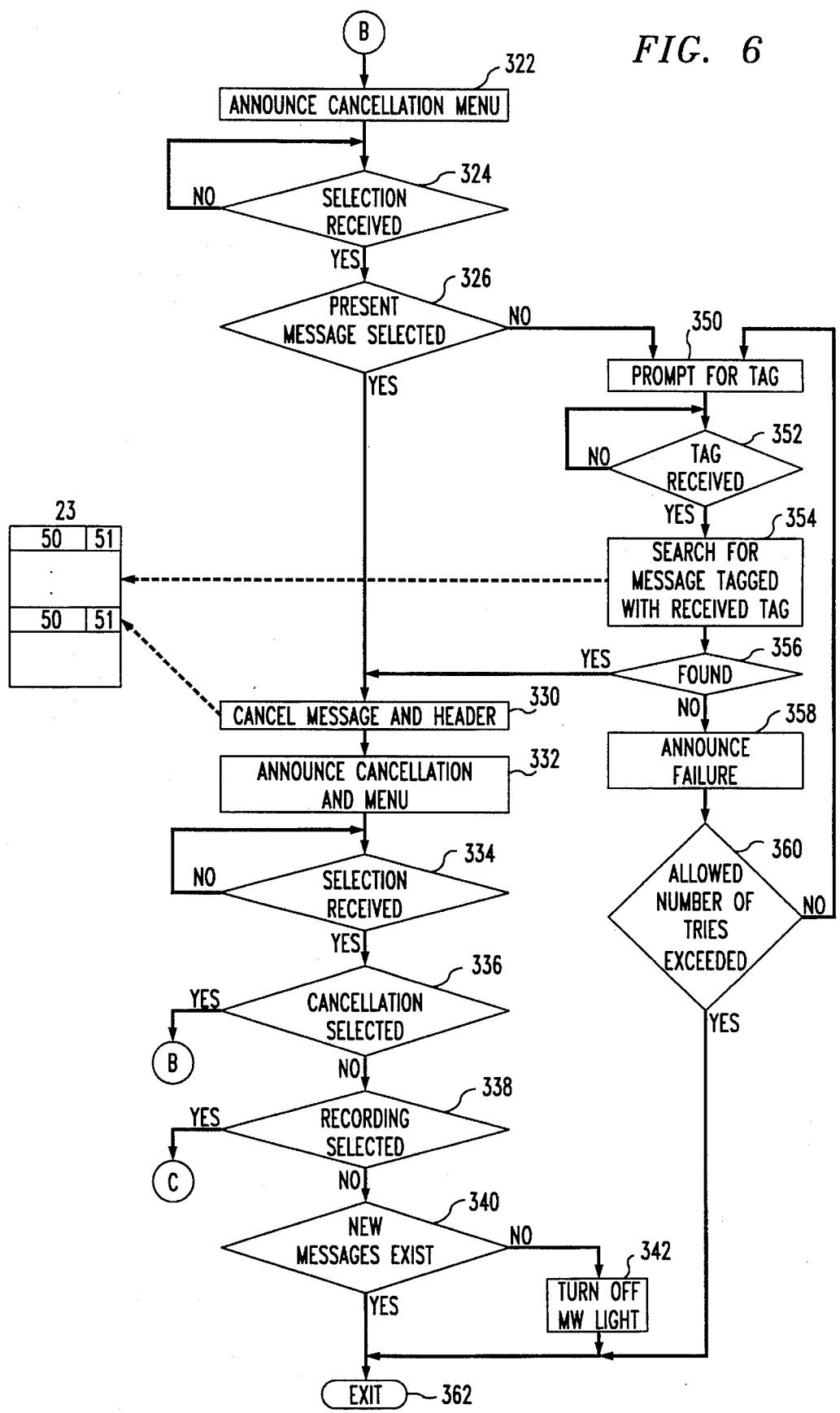

Returning to step 320 of FIG. 4, if it is there determined that the caller elected to cancel a message, processor 20 announces the cancellation menu to the caller, at step 322 of FIG. 6. This announcement is illustratively as follows: "If you wish to cancel the message you just recorded, press one; if you wish to cancel a previous message, press two." Processor 20 then awaits the caller's selection, at step 324. If the caller has elected to cancel the just-recorded (present) message, as determined at step 326, processor 20 cancels— erases—the message and its header, at step 330. Processor 20 then announces the cancellation and a menu of choices to the caller, at step 332. This announcement is illustratively as follows: "The message has been canceled. To record a new message, press one; to cancel another message, press two; otherwise please hang up." Processor 20 then awaits the caller's selection, at step 334. If the caller has elected cancel another message, as determined at step 336, processor 20 returns to step 322. If the caller has elected to record a new message, as determined at step 338, processor 20 returns to step 314 of FIG. 4. If the caller hangs up, processor 20 checks, at step 340, whether any new— unretrieved— messages exist for the subscriber. If not, processor 20 takes action, at step 342, to turn off the subscriber's message-waiting (MW) lamp that was turned on at step 314. Following step 342, or if processor 20 determines at step 340 that new messages exist, processing of the call is completed and processor 20 exits the call processing functions, at step 362.

Returning to step 326, if the caller has elected to cancel a message that he or she left earlier, processor 20 announces a prompt to the caller for the message's corresponding tag, at step 350. Illustratively, the announcement is "Please enter the 5-digit tag code of the message you wish to cancel." Processor 20 then awaits the caller's input, at step 352. Upon receipt of the tag from the caller, processor 20 searches tag field 51 of message headers 50 in the recipient subscriber's mailbox 23 for the received tag, at step 354. If processor 20 finds a header 50 with that tag, at step 356, it proceeds to step 330 to erase the header 50, the tag 51, and the corresponding message. If processor 20 does not find a header 50 with the received tag, it announces the failure to the caller, at step 358. Processor 20 then checks whether an allowed number of tries to identify the message which the caller wishes to cancel has been exceeded, at step 360. If not, processor 20 returns to step 350 to give the caller another chance; if so, processor 20 proceeds to step 362 to terminate the call.

Of course, various changes and modifications to the illustrative embodiment described above will be apparent to those skilled in the art. For example, the sender may be given a choice of modifying the sent message, in addition to the choice of canceling it. In such a case, the message's time stamp, which indicates when the message was received, will have to be updated to reflect the time when the message was modified. Or, a subscriber who broadcast a message from his or her mailbox to a list of recipients may request his or her serving voice message system to automatically contact all the recipients' mailboxes on the subscriber's behalf and attempt to cancel the message.

Also, the electronic messaging system can maintain a queue (FIFO) of its own system tag codes. These codes may be used exclusively in such a system, or may be used in addition to caller-selected codes. If they are used in addition to caller-selected codes, then they can be uniquely identified as system codes by virtue of incorporating a (*) or (#) in the tag code digit string, or by always beginning with 0 (or some other digit) that would not be permitted for a caller-selected code, or could be a string one digit longer than that permitted by user selection. Then, whenever a tag code is needed (for broadcast messages, for example, or when the caller wants the system to pick a tag code), the system takes the next one off the queue. Also, each time a caller selects a non-unique tag code, a count could be incremented to allow only a fixed number of tries to tag a message with a caller-specified tag code. When the count is exceeded, the system could supply its own tag code. Each time a tag code is discarded, by virtue of retrieving or canceling all messages with that tag, that tag code can be put back on the end of the queue for later re-use. The system can maintain a master file of tag codes currently in use, and, for broadcast messages (messages to several users), can maintain a count along with the tag code presently in use that represents the number of mailboxes in which this particular tag code is presently being used. Each time a tagged message is canceled or retrieved, the system deducts one from the count and when the count is zero, the tag code may now be re-used by the system.

Furthermore, instead of informing the caller before recording the message that the message may be tagged for later retrieval, the expanded menu announcement could consist of a phrase: "After recording, press one to gain access to additional features", whereupon the caller would record the message, then press one, discover by system announcement that the message may be tagged (provided MCF is active for the subscriber), and continue with the tagging process as described.

Such changes and modifications can be made without departing from the spirit and the scope of the invention and without diminishing its attendant advantages. It is therefore intended that such changes and modifications be covered by the following claims.

I claim:

1. A method of operating a messaging arrangement, comprising the steps of:

storing a message from an originator of the message in a mailbox of a recipient of the message, the recipient being other than the message originator;

obtaining a message identifier from the message originator;

examining message identifiers of tagged messages in the mailbox of the recipient to determine whether the obtained message identifier is different from the message identifiers of the tagged messages;

in response to determining that the obtained message identifier is different, tagging the message from the message originator with the obtained message identifier;

in response to determining that the obtained message identifier is not different, obtaining another message identifier from the message originator and returning to the step of examining;

in response to a caller logging into the mailbox of the recipient by supplying login information different from any message identifier, providing the caller with access to any messages stored in the mailbox of the recipient; and in response to the message originator supplying a message identifier with which a tagged message stored in the mailbox of the recipient is tagged without also supplying the login information, providing the message originator with access to only the tagged message in the mailbox of the recipient that is tagged with the message identifier supplied by the message originator without also providing the message originator with access to any other messages stored in the mailbox of the recipient that are not tagged with the message identifier supplied by the message originator.

2. A method of operating a messaging arrangement, comprising the steps of:

in response to a request from an originator of a message, the messaging arrangement automatically generating a message identifier;

tagging a message from the message originator with the generated message identifier;

disclosing the generated message identifier to the message originator;

storing the tagged message in a mailbox of a recipient of the tagged message, the recipient being other than the message originator;

in response to a caller logging into the mailbox of the recipient by supplying login information different from any message identifier, providing the caller with access to any messages stored in the mailbox of the recipient; and in response to the message originator supplying a message identifier with which a tagged message stored in the mailbox of the recipient is tagged without also supplying the login information, providing the message originator with access to only the tagged message in the mailbox of the recipient that is tagged with the message identifier supplied by the message originator without also providing the message originator with access to any other messages stored in the mailbox of the recipient that are not taggged with the message identifier supplied by the message originator.

3. The method of claim 2 wherein the step of automatically generating a message identifier comprises the step of:

automatically generating the message identifier, the message identifier representing present date and time at which the message identifier is automatically generated.

4. The method of claim 2 wherein the step of storing comprises the steps of:

sending the tagged message from a mailbox of the message originator to the mailbox of the recipient; and in response to receipt of the sent tagged message, storing the sent tagged message in the mailbox of the recipient.

5. A method of operating a messaging arrangement, comprising the steps of:

tagging a message with a message identifier;

storing the tagged message in a mailbox of a recipient of the tagged message, the recipient being other than an originator of the tagged message;

in response to a caller logging into the mailbox of the recipient by supplying login information different from any message identifier, providing the caller with access to any messages stored in the mailbox of the recipient;

in response to the message originator reaching the mailbox of the recipient without supplying the login information, asking the message originator whether the message originator wishes to access a message stored in the mailbox of the recipient;

in response to the message originator responding that the message originator wishes to access a message stored in the mailbox of the recipient, asking the message originator for an identifier of the message that the message originator wishes to access;

in response to the message originator supplying the identifier of the message that the message originator wishes to access, searching the mailbox of the recipient for a message tagged with the supplied message identifier; and in response to finding a message tagged with the message identifier supplied by the message originator which is stored in the mailbox of the recipient, providing the message originator with access to only the tagged message in the mailbox of the recipient that is tagged with the message identifier supplied by the message originator without also providing the message originator with access to any other messages stored in the mailbox of the recipient that are not tagged with the message identifier supplied by the message originator.

6. The method of claim 5 wherein the step of providing the message originator with access to only the tagged message comprises the step of:

cancelling the tagged message that is tagged with the message identifier supplied by the message originator from the mailbox of the recipient.

7. The method of claim 5 wherein the step of providing the message originator with access to only the tagged message comprises the step of:

modifying the tagged message that is tagged with the message identifier supplied by the message originator in the mailbox of the recipient.

8. The method of claim 5 wherein the step of tagging comprises the steps of:

obtaining the message identifier from the message originator; and tagging a message from the message originator with the message identifier to form the tagged message.

9. The method of claim 5 wherein the step of tagging comprises the steps of:

obtaining a message from the message originator;

in response to a request from the message originator, obtaining the message identifier; and tagging the message from the message originator with the obtained message identifier to form the tagged message.

10. A messaging apparatus comprising:

a mailbox for holding messages for a recipient of the messages;

means for storing a message received from a message originator in the mailbox of the recipient of the message;

means responsive to receiving a message identifier from the message originator, for examining message identifiers of tagged messages in the recipient's mailbox to determine whether the received message identifier is different from the message identifiers of the tagged messages;

means responsive to a determination that the received message identifier is different, for tagging the message from the message originator with the received message identifier;

means responsive to a determination that the received message identifier is not different, for requesting another message identifier from the message originator for the examining means;

means responsive to a caller logging into the mailbox of the recipient, by supplying login information different from any message identifier, for providing the caller with access to any messages stored in the mailbox of the recipient; and means responsive to the message originator supplying a message identifier of a tagged message stored in the mailbox of the recipient without also supplying the login information, for providing the message originator with access to only the tagged message stored in the mailbox of the recipient that is tagged with the message identifier supplied by the message originator without also providing the message originator with access to any other messages stored in the mailbox of the recipient that are not tagged with the message identifier supplied by the message originator.

11. A messaging apparatus comprising:

a mailbox for holding messages for a recipient of the messages;

means responsive to a request from a message originator, for automatically generating a message identifier and tagging a message from the message originator with the generated message identifier;

means for disclosing the generated message identifier to the message originator;

means for sending the tagged message to the mailbox of the recipient;

means for storing the tagged message in the mailbox of the recipient;

means responsive to a caller logging into the mailbox of the recipient, by supplying login information different from any message identifier, for providing the caller with access to any messages stored in the mailbox of the recipient; and means responsive to the message originator supplying a message identifier of a tagged message stored in the mailbox of the recipient without also supplying the login information, for providing the message originator with access to only the tagged message stored in the mailbox of the recipient that is tagged with the message identifier supplied by the message originator without also providing the message originator with access to any other messages stored in the mailbox of the recipient that are not tagged with the message identifier supplied by the message originator.

12. The apparatus of claim 11 wherein the generated message identifier represents present date and time at which the message identifier is automatically generated.

13. The apparatus of claim 11 wherein the tagging means tag the message from the message originator with the generated message identifier in the mailbox of the message originator; and the sending means send the tagged message from the mailbox of the message originator to the mailbox of the recipient.

14. A messaging apparatus comprising:

a mailbox for holding messages for a recipient of the messages;

means for storing a message received from a message originator and tagged with a message identifier, in the mailbox of the recipient of the message;

means responsive to a caller logging into the mailbox of the recipient, by supplying login information different from any message identifier, for providing the caller with access to any messages stored in the mailbox of the recipient;

means responsive to the message originator reaching the mailbox of the recipient without supplying the login information, for asking the message originator whether the message originator wishes to access a message stored in the mailbox of the recipient;

means responsive to the message originator responding that the message originator wishes to access a message stored in the mailbox of the recipient, for asking the message originator for an identifier of the message that the message originator wishes to access;

means responsive to the message originator supplying the identifier of the message that the message originator wishes to access, for searching the mailbox of the recipient for a message tagged with the message identifier supplied by the message originator; and means responsive to finding a message tagged with the message identifier supplied by the message originator stored in the mailbox of the recipient, for providing the message originator with access to only the tagged message stored in the mailbox of the recipient that is tagged with the message identifier supplied by the message originator without also providing the message originator with access to any other messages stored in the mailbox of the recipient that are not tagged with the message identifier supplied by the message originator.

15. The apparatus of claim 14 comprising:

means for obtaining the message for storing from the message originator;

means responsive to a request from the message originator, for obtaining the message identifier; and means for tagging the message from the message originator with the obtained message identifier.

16. The apparatus of claim 14 wherein the means for providing the message originator with access to only the tagged message comprise:

means for cancelling the tagged message that is tagged with the message identifier supplied by the message originator, from the mailbox of the recipient.

17. The apparatus of claim 14 wherein the means for providing the message originator with access to only the tagged message comprise:

means for modifying the tagged message that is tagged with the message identifier supplied by the message originator, in the mailbox of the recipient.

18. The apparatus of claim 14 further comprising:

means responsive to receiving the message identifier from the message originator, for tagging the message from the message originator with the received message identifier to form the tagged message.

19. A method of operating a messaging arrangement, comprising the steps of:

storing a message tagged with a message identifier in a mailbox of a recipient of the tagged message;

logging in to the mailbox of the recipient via login information different from the message identifier;

following the logging in, performing one of either activating or inactivating a message access functionality for the mailbox of the recipient;

providing a caller who has reached the mailbox of the recipient access to any messages stored in the mailbox of the recipient irrespective of whether the message access functionality is activated or inactivated for the mailbox of the recipient, in response to receipt from the caller of the login information different from the message identifier; and in response to any caller who has reached the mailbox of the recipient supplying the message identifier of the message stored in the mailbox of the recipient and tagged with the message identifier without also supplying the login information, determining whether the message access functionality is activated or inactivated for the mailbox of the recipient; and only in response to both (a) a determination that the message access functionality is activated for the mailbox of the recipient and (b) said any caller supplying the message identifier of the message stored in the mailbox of the recipient and tagged with the message identifier without also supplying the login information, providing said any caller with access to only the message stored in the mailbox of the recipient and tagged with the message identifier without also providing said any caller with access to any other messages stored in the mailbox of the recipient that are not tagged with the message identifier.

20. A method of operating messaging arrangement, comprising the steps of:

tagging a message with a message identifier;

storing the tagged message in a mailbox of a recipient, the recipient being other than an originator of the tagged message;

logging in to the mailbox of the recipient via login information different from the message identifier;

following the logging in, performing one of either activating or inactivating a message access functionality for the mailbox of the recipient;

providing a caller access to any messages stored in the mailbox of the recipient irrespective of whether the message access functionality is activated or inactivated for the mailbox of the recipient, in response to the caller logging into the mailbox of the recipient by supplying the login information different from the message identifier;

in response to the message originator reaching the mailbox of the recipient and supplying the message identifier of the tagged message stored in the mailbox of the recipient without also supplying the login information, determining whether the message access functionality is activated or inactivated for the mailbox of the recipient; and only in response to both (a) a determination that the message access functionality is activated for the mailbox of the recipient and (b) the message originator supplying the message identifier of the tagged message stored in the mailbox of the recipient without also supplying the login information, providing the message originator with access to only the tagged message in the mailbox of the recipient that is tagged with the message identifier supplied by the message originator without also providing the message originator with access to any other messages stored in the mailbox of the recipient that are not tagged with the message identifier supplied by the message originator.

21. A messaging apparatus comprising:

means for storing a message tagged with a message identifier in a mailbox of a recipient of the tagged message;

means for enabling a user to log in to the mailbox of the recipient via login information different from the message identifier;

means for enabling the user to activate or inactivate a message access functionality for the mailbox of the recipient following the logging in;

means responsive to receipt from a caller of the login information different from the message identifier, for providing the caller access to any messages stored in the mailbox of the recipient irrespective of whether the message access functionality is activated or inactivated for the mailbox of the recipient;

means responsive to any caller who has reached the mailbox of the recipient supplying the message identifier of the tagged message stored in the mailbox of the recipient without also supplying the login information, for determining whether the message access functionality is activated or inactivated for the mailbox of the recipient; and means only responsive to both (a) a determination that the message access functionality is activated for the mailbox of the recipient and (b) said any caller supplying the message identifier of the tagged message stored in the mailbox of the recipient without also supplying the login information, for providing said any caller with access to only the tagged message stored in the mailbox of the recipient that is tagged with the supplied message identifier without also providing said any caller with access to any other messages stored in the mailbox of the recipient that are not tagged with the supplied message identifier.

22. A messaging apparatus comprising:

a mailbox for holding messages for a recipient of the messages;

means for storing a message received from a message originator and tagged with a message identifier, in the mailbox of the recipient of the message;

means for enabling a user to log in to the mailbox of the recipient via login information different from the message identifier;

means for enabling the user to activate or inactivate a message access functionality for the mailbox of the recipient following the logging in;

means for providing a caller access to any messages stored in the mailbox of the recipient irrespective of whether the message access functionality is activated or inactivated for the mailbox of the recipient, responsive to the caller logging into the mailbox of the recipient by supplying the login information different from the message identifier;

means responsive to the message originator reaching the mailbox of the recipient and supplying the message identifier of the tagged message stored in the mailbox of the recipient without also supplying the login information, for determining whether the message access functionality is activated or inactivated for the mailbox of the recipient; and means only responsive to both (a) a determination that the message access functionality is activated for the mailbox of the recipient and (b) the message originator supplying the message identifier of the tagged message stored in the mailbox of the recipient without also supplying the login information, for providing the message originator with access to only the tagged message stored in the mailbox of the recipient that is tagged with the message identifier supplied by the message originator without also providing the message originator with access to any other messages stored in the mailbox of the recipient that are not tagged with the message identifier supplied by the message originator.

* * * * *